BINARY PULSE COUNTER FOR RADICES $2^x+1$ WHERE $x$ IS ANY INTEGER
Filed Dec. 12, 1961
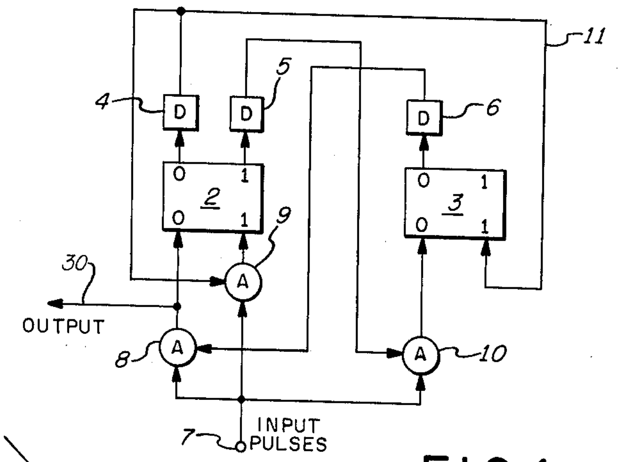
FIG. 1.
TABLE A
| TIME | ELEMENT 2 | ELEMENT 3 |
|---|---|---|
| $t_0$ | 0 | 1 |
| $t_1$ | 1 | 1 |
| $t_2$ | 1 | 0 |
| $t_3$ | 0 | 0 |
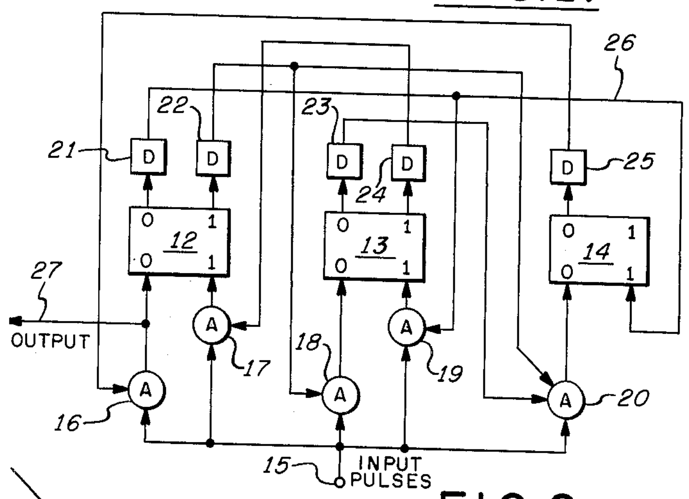
FIG. 2.
TABLE B
| TIME | ELEMENT 12 | ELEMENT 13 | ELEMENT 14 |
|---|---|---|---|
| $t_0$ | 0 | 0 | 1 |
| $t_1$ | 0 | 1 | 1 |
| $t_2$ | 1 | 1 | 1 |
| $t_3$ | 1 | 0 | 1 |
| $t_4$ | 1 | 0 | 0 |
| $t_5$ | 0 | 0 | 0 |
| ROW | COLUMN 1 | 2 | 3 | 4 | 5 |
|---|---|---|---|---|---|
| 1 | 0 | 0 | 0 | 0 | 1 |
| 2 | 0 | 0 | 0 | 1 | 1 |
| 3 | 0 | 0 | 1 | 1 | 1 |
| 4 | 0 | 0 | 1 | 0 | 1 |
| 5 | 0 | 1 | 1 | 0 | 1 |
| 6 | 0 | 1 | 1 | 1 | 1 |
| 7 | 0 | 1 | 0 | 1 | 1 |
| 8 | 0 | 1 | 0 | 0 | 1 |
| 9 | 1 | 1 | 0 | 0 | 1 |
| 10 | 1 | 1 | 0 | 1 | 1 |
| 11 | 1 | 1 | 1 | 1 | 1 |
| 12 | 1 | 1 | 1 | 0 | 1 |
| 13 | 1 | 0 | 1 | 0 | 1 |
| 14 | 1 | 0 | 1 | 1 | 1 |
| 15 | 1 | 0 | 0 | 1 | 1 |
| 16 | 1 | 0 | 0 | 0 | 1 |
| 17 | 1 | 0 | 0 | 0 | 0 |
| 18 | 0 | 0 | 0 | 0 | 0 |
FIG. 3.
INVENTOR.
HOWARD M. GORLIN
BY
[signature]
ATTORNEY 3,200,339
Patented Aug. 10, 1965

3,200,339

BINARY PULSE COUNTER FOR RADICES $2^x+1$ WHERE X IS ANY INTEGER

Howard M. Gorlin, Flushing, N.Y., assignor to Sperry Rand Corporation, Great Neck, N.Y., a corporation of Delaware Filed Dec. 12, 1961, Ser. No. 158,659
3 Claims. (Cl. 328—46)

The present invention generally relates to binary pulse counters and, more particularly, to a binary pulse counter characterized by its minimum complexity, maximum reliability, and adaptation for radices determined by the expression $2^x+1$ where $x$ is any integer.

Binary pulse counters utilizing a plurality of interconnectable bistable elements are well known in the art. Where maximum reliability considerations prevail, it is desirable that the individual bistable elements be triggered by pulses applied to the "set" and "reset" input terminals thereof. For purposes of the present invention, a "set" input terminal is used to place the bistable element in a first binary state if it is not already in that state, whereas a "reset" input terminal is used to place the bistable element in the other of its binary states if it is not already in said other state. This is in contradistinction to the so-called "trigger" input which is used to invert the existing state of the bistable element irrespective of which state it might be. Experience has shown that a bistable element responds more reliably to pulses applied to the set and reset input terminals than to pulses applied to the trigger input terminal.

Considerations other than reliability also must be taken into account in the design of an optimized counting circuit. It is always desirable, of course, that circuit complexity be reduced to a minimum in controlling the plurality of interconnected bistable elements and in producing an output pulse each time that the radix of the counter is exceeded.

It is a general object of the present invention to provide a binary pulse counter characterized by maximum reliability and minimum circuit complexity.

Another object is to provide a binary pulse counter especially suited for operation at radices in accordance with the expression $2^x+1$ where $x$ may be any integer.

A further object is to provide a simplified and reliable binary pulse counter for producing an output pulse each time that a quantity $2^x+1$ input pulses are received where $x$ may be any integer.

These and other objects of the present invention, as will appear from reading the following specification, are achieved by the provision of a plurality of $m$ bistable elements, each element having a set and a reset input terminal. Each element produces a first output signal when its set terminal is pulsed and a second output signal when its reset terminal is pulsed. A plurality of gating means are provided for directing the flow of the pulses being counted to all but one of said input terminals. Additional circuit means are included for applying all but one of the output signals to the gating means. The applied output signals control the gating means in accordance with an $n$-valued binary cyclic code truth table where $n=2^{m-1}+2$. One of the columns of the aforesaid truth table consists of $n-2$ consecutive binary ones and 2 binary zeroes, the cited column corresponding to the bistable element having the singular input terminal receiving no input pulse and producing the one output signal which is not applied to any of the gating means. Lastly, an output signal from another of the bistable elements is directly applied to said singular input terminal.

The reliability of the pulse counter is maximized by directing the flow of input pulses only to the set and reset input terminals of the individual bistable elements.

The complexity of the pulse counter is minimized by instrumenting it in accordance with the binary cyclic code truth table. The extraction of an input pulse each time that the counter radix is exceeded is simplified by the aforementioned application of the output signal directly to said singular input terminal.

For a more complete understanding of the present invention, reference should be had to the following specification and to the appended figures of which:

FIG. 1 is a simplified block diagram of an embodiment of the invention operating with the radix 3;

FIG. 2 is a simplified block diagram of an embodiment operating with the radix 5; and FIG. 3 is a binary cyclic code truth table for instrumenting another embodiment having the radix 17.

Referring to FIG, 1, the numerals 2 and 3 generally designate a pair of bistable elements. Each of said elements has a reset and a set input terminal arbitrarily designated by the lower numerals 0 and 1, respectively. Each bistable element is further characterized by producing when reset a first output signal at the upper terminal designated 0 and producing when set a second output signal at the upper terminal designated 1. Each of the output signals produced by element 2 is applied to a respective pulse delay device 4 and 5. The "zero" output signal of element 3 is similarly applied to delay device 6. Each of the delay devices introduces a delay somewhat greater in magnitude than the duration of the input pulses applied to terminal 7 which input pulses are to be counted.

The input pulses are jointly applied to first inputs of AND gates 8, 9 and 10. Said AND gates, when activated, direct the flow of the input pulses to the designated inputs of elements 2 and 3. It should be noted that input 1 of element 3 receives no input pulse; moreover the "one" output signal from element 3 is not utilized. The signals at the outputs of the delay devices 4, 5 and 6 are connected to second inputs of the AND gates 8, 9 and 10 in accordance with the binary cyclic code truth table A wherein the tabulated binary numbers represent the successive binary states of the elements 2 and 3 in response to the input pulses applied to terminal 7. More particularly, the output of delay 6 is connected to a second input of AND gate 8, the output of delay 5 is coupled to a second input of AND gate 10, and the output of delay 4 is connected to a second input of AND gate 9 and directly to an input 1 of element 3. In some cases, particularly where the frequency of the input pulses at terminal 7 is high, it may be preferable to apply the "zero" output signal from element 2 directly to the input 1 of element 3 without undergoing a delay in delay 4.

In operation, it is assumed that the states of elements 2 and 3 are initially 0 and 1, respectively, as indicated in the truth table at time $t_0$. The delayed "zero" output of element 2 conditions gate 9 for conduction and places element 3 in state "one." Gates 8 and 10 are inhibited against conduction by the absence of a zero output in element 3 and the absence of a 1 output from element 2, respectively.

Upon the occurrence of the first input pulse applied to terminal 7, AND gate 9 conducts causing the initial 0 state of element 2 to reverse to state 1. This is shown in the truth table at time $t_1$. The delay 1 output from element 2 conditions AND gate 10 for conduction. AND gates 8 and 9 are inhibited against conduction by the absence of a zero output from element 3 and the absence of a zero output of element 2, respectively.

Upon the occurrence of the second input pulse applied to terminal 7, AND gate 10 conducts, placing element 3 in state 0. This is indicated in the truth table at time $t_2$. The delayed zero output from element 3 conditions gate 8 for conduction. Gate 10 remains conditioned for conduction by the continuing 1 output from element 2. Gate 9 is inhibited from conducting by the absence of a zero output from element 2.

Upon the occurrence of the third input pulse applied to terminal 7, AND gates 8 and 10 simultaneously conduct, placing element 2 in state 0 and maintaining element 3 in its existing 0 state. This is shown in the truth table at time $t_3$. The pulse which places element 2 in state 0 is made available on line 30 as the output pulse.

Upon the application of the delayed zero output from element 2 via line 11 to the 1 input of element 3 (after the third input pulse has subsided), element 3 is immediately placed into state 1. This occurs before the application of any further input pulses to terminal 7. Thus, the counter state 00 represented in the truth table at time $t_3$ is an unstable condition. For this reason the numerals 00 are shown dotted in the truth table. It should be noted that the undelayed zero output from element 2 may be directly applied to the 1 input of element three to produce the same ultimate result whereby 00 becomes an unstable condition and element 3 is placed into state 1 after the occurrence of the third input pulse.

With restoration of the states 0 and 1 in elements 2 and 3, respectively, AND gate 9 again is conditioned for conduction as in the condition represented in the truth table at time $t_0$. Upon the occurrence of the next (4th) input pulse applied to terminal 7, AND gate 9 conducts, setting element 2 into state 1. It should be noted that the intervals between successive output pulses on line 11 is equal to the interval between 3 successive input pulses applied to line 7.

As will be seen more fully later, the invention is particularly suited for pulse counter applications operating with radices determined in accordance with the expression $2^x+1$ where $x$ may be any integer. In the embodiment of FIG. 1, the radix is 3. Another typical radix is 5 which is the case of the circuit of FIG. 2.

The counter of FIG. 2 comprises a number of bistable elements, pulse delay devices and AND gates similar to those represented in FIG. 1. The interconnections between the circuit components of FIG. 2 are made in accordance with binary cyclic code truth table B which resembles the code of table A in four important respects: (1) each of the $n$ successive binary number differs from the next by a change in the binary value of only one digit, i.e., the code is a cyclic code; (2) one of the columns of the code consists of $n-2$ consecutive binary ones and two binary zeros where $n=2^{m-1}+2$; (3) the cited column corresponds to the bistable element 14 (corresponding to element 3 of FIG. 1) having the singular input terminal receiving no input pulse and producing the one output signal which is not applied to any of the gating means; (4) the last row of table B (at time $t_5$) represents an unstable condition for the counter comprising elements 12, 13 and 14 in the same manner that the last row (at time $t_3$) of table A represents an unstable condition for the counter comprising elements 2 and 3.

The input pulses to be counted are jointly applied to first inputs of AND gates 16–20. Said AND gates when activated direct the flow of the input pulses to the indicated inputs of elements 12, 13 and 14. It should again be noted that input 1 of element 14 receives no input pulse; moreover the "one" output signal from element 14 is not utilized. Each of the other output signals from element 12, 13 and 14 is applied to a respective delay device 21, 22, 23, 24 and 25. The signals at the output of the delay devices 21–25 are connected to second inputs of the AND gates 16–20 in accordance with the binary cyclic code truth table B wherein the tabulated binary numbers represent the successive binary states of the elements 12, 13 and 14 in response to the input pulses applied to terminal 15. In particular, the output of delay 21 is connected to a second input of AND gate 19 and to the 1 input of element 14. As mentioned in the case of FIG. 1, the "zero" output signal from element 12 may instead be applied directly to the input 1 of element 14 without undergoing a delay in delay 21. The output of delay 22 is jointly coupled to second inputs of AND gates 18 and 20. The output of delay 23 is coupled to a third input of AND gate 20. The output of delay 24 is applied to a second input of AND gate 17. Lastly, the output of delay 25 is applied to a second input of AND gate 16.

In operation, it is assumed that the states of elements 12, 13 and 14 are initially 0, 0 and 1, respectively, as indicated in truth table B at time $t_0$. The delayed "zero" output of element 12 conditions AND gate 19 for conduction and places element 14 in state "one." Gates 16, 17, 18 and 20 are inhibited against conduction by the absence of a 0 output from element 14, the absence of a 1 output from element 13, the absence of a one output from element 12, and the absence of a one output from element 12, respectively.

Upon the occurrence of the first input pulse applied to terminal 15, AND gate 19 conducts causing the initial 0 state of element 13 to reverse to state 1. This is shown in the truth table at time $t_1$ by the notation 011. The delayed 1 output from element 13 conditions AND gate 17 for conduction. Gate 19 remains ready to conduct because of the continuing 0 output from element 12. AND gates 16, 18 and 20 are inhibited against conduction by the absence of a 0 output from element 14, the absence of a 1 output from element 13 and the absence of a 1 output from element 12 respectively.

Upon the occurrence of the second input pulse applied to terminal 15 AND gates 17 and 19 conduct, placing element 12 in state 1 and maintaining element 13 in its existing 1 state. This is shown in the truth table at time $t_2$ by the notation 111. The delayed 1 output from element 12 conditions AND gate 18 and partially conditions AND gate 20 for conduction. AND gate 20, however, does not conduct because of the absence of a 0 output from element 13. AND gate 17 remains conditioned for conduction by the continuing one output from element 13.

Upon the occurrence of the third input pulse applied to terminal 15, AND gates 17 and 18 conduct simultaneously, placing element 13 in state 0 and maintaining element 12 in its existing 1 state. This is shown in table B at time $t_3$ by the notation 101. The delayed 0 output from element 13 satisfies one of the conduction requirements for AND gate 20, the second conduction requirement being met by the continiung 1 output from element 12. Gate 18 remains set to conduct by the continuing 1 output from element 12. The other gates 16, 17 and 19 are inhibited against conduction.

Upon the occurrence of the fourth input pulse, AND gates 18 and 20 conduct simultaneously, placing element 14 in state 0 and maintaining element 13 in state 0. This is shown in the table at time $t_4$ by the notation 100. The delayed 0 output from element 14 conditions gate 16 for conduction. Gate 18 remains ready to conduct because of the continuing 1 output from element 12. The other gates 17, 18, 19 and 20 are inhibited.

Upon the occurrence of the 5th input pulse, AND gates 16 and 18 conduct thereby producing an output pulse on line 27, placing element 12 in state 0, and maintaining element 13 in its existing state 0. This is shown in table B at time $t_5$ by the notation 000.

Upon the application of the delayed 0 output from element 12 via line 26 to the 1 input of element 14 (after the 5th input pulse has subsided) element 14 is immediately placed into state 1. This occurs before the application of any further input pulse to terminal 15. In other words, the counter state 000 represented in truth table at time $t_5$ is an unstable condition. Following the convention adopted in table A, the numerals 000 are shown dotted in table B to designate said unstable condition.

As in the case of FIG. 1, the undelayed 0 output from element 12 may be directly applied to the 1 input of element 14, if desired. This marks the completion of the first cycle of operation of the counter comprising bistable elements 12, 13 and 14 which now have been restored to the initial condition 001. The entire sequence of operation then repeats beginning with the application of the 6th input pulse to terminal 15. It should be noted that the interval between successive output pulses on line 27 is equal to the interval between five successive input pulses applied to terminal 15.

Other pulse counting circuit embodiments recycling over a radix determined by the expression $2^x+1$ may be readily designed by the straight forward extrapolation of the techniques described in connection with the arrangements of FIGS. 1 and 2. An understanding of the design technique to be followed in the general case will be facilitated by considering the binary cyclic code truth table of FIG. 3. For convenience, the table of FIG. 3 will be referred to in terms of the indicated row and column positions of the individual binary digits.

Although the invention requires the use of a special binary cyclic code, it is not necessary that an entirely new cyclic code be developed. Instead, it is convenient to utilize an existing conventional binary cyclic code and to modify the same in accordance with relatively simple rules to synthesize the specifically required code.

For example, consider the problem of devising a specific binary cyclic code for a pulse counter embodiment adapted for operation with the radix 17. In this case, $n=18$ (represented by the 18 rows of binary numbers of FIG. 3), and $m=5$ (represented by the 5 columns of binary digits). Columns 1–4 inclusive of rows 1–16 inclusive of the table of FIG. 3 is identical to a conventional Gray (cyclic) code representing the equivalent decimal values 0–15 inclusive. Such a code is shown on pages 3–11 of "Notes on Analogue Digital Conversion Techniques," edited by Alfred K. Susskind and published by the Technology Press, Massachusetts Institute of Technology, 1957.

The necessary modification of the above-mentioned conventional 15-valued Gray code is accomplished by the addition of the 5th column of binary digits consisting of 16 consecutive ones and two binary zeros. It should be noted that the addition of the 5th digit to each binary number in no way alters the cyclic quality of the conventional Gray code. The basic Gray code is further modified by the addition of the values indicated in rows 17 and 18 of FIG. 3, namely, the values 10000 and 00000. It should be observed that row 17 differs from row 16 by a change in the value of the 5th column digit from 1 to 0. Row 18 differs from row 17 by a change in the value of the first column digit from 1 to 0. Thus the cyclic nature of the original code is preserved in the modified code.

In order to instrument the truth table represented in FIG. 3, it is necessary to provide five bistable elements similar to elements 2, 3, 12, 13 and 14 of FIGS. 1 and 2. Similarly, one AND gate and one pulse delay device is allotted to each of the input and output terminals, respectively, of the five bistable elements excepting the "one" input terminal and the "one" output terminal of the 5th bistable element. The delayed (or undelayed) "zero" output of the 1st bistable element is directly applied to the said "one" input of the 5th bistable element whereby condition 18 of the five stage counter represented by 00000 of FIG. 3 becomes unstable. The remaining interconnections between the output signals from each of the bistable elements and the gating circuits are determined in accordance with conventional design techniques based on the truth table of FIG. 3. The result is a pulse counter embodiment adapted to count with a radix of 17, i.e., a radix equal to $2^x+1$ where $x$ equals 4.

From the preceding specification, it will be seen that the objects of the present invention have been achieved by the provision of a plurality of $m$ bistable elements each having a set and reset input terminal, and a plurality of pulse gating means for directing the flow of the pulses being counted to all but one of said input terminals. Each element produces a first output signal when its set terminal is pulsed and a second output signal when its reset terminal is pulsed. Additional circuit means are included for applying all but one of the output signals to the gating means. The applied output signals control the gating means in accordance with an $n$-valued binary cyclic code truth table where $n=2^{m-1}+2$. One of the columns of the truth table consists of $n-2$ consecutive binary ones and two binary zeros, the cited column corresponding to the particular bistable element having the singular input terminal receiving no input pulse and producing the one output signal which is not applied to any of the gating means. By virtue of the application of an output signal from another of the bistable elements to said singular input terminal, one of the conditions of the counter (including one of the zeros of the cited truth table column) becomes unstable. Only one stable condition remains having a zero in the cited column which simplifies the extraction of an output from the counter each time that the radix is exceeded. In particular, the AND gate such as gate 8 of FIG. 1 or AND gate 16 of FIG. 2 which is conditioned by the 0 output from said particular bistable element may be utilized for the extraction of the counter output pulse. No special or auxiliary gating means is required to develop said output pulse.

While the invention has been described in its preferred embodiments it is to be understood that the words which have been used are words of description rather than limitation and that changes within the purview of the appended claims may be made without departing from the true scope and spirit of the invention in its broader aspects.

What is claimed is:

1. Digital apparatus comprising
   a plurality of bistable elements, each element having reset and set input terminals and first and second output terminals whereby each element produces a first output signal at said first output terminal when said reset terminal is pulsed and a second output signal at said second output terminal when said set terminal is pulsed,
   a source of pulses,
   gating means connected to said source for directing the flow of said pulses to all but one of said input terminals of a particular one of said bistable elements,
   circuit means connected to all but one of said output terminals of said particular one of said bistable elements for applying said output signals to said gating means for the actuation thereof in accordance with an $n$-valued binary cyclic code truth table where $n=2^{m-1}+2$ and $m$ represents the number of said bistable elements, one of the columns of said truth table consisting of $n-2$ consecutive binary ones and two binary zeros, said one of said columns corresponding to said particular one of said bistable elements having the singular input terminal receiving no pulses,
   and means for applying to said one of said input terminals of said particular one of said bistable elements an output signal from another of said bistable elements.

2. A binary pulse counter producing an output pulse each time that a count of $2^x+1$ input pulses is received where $x$ is any integer, said counter comprising,
   a plurality of bistable elements, each element having reset and set input terminals and first and second output terminals whereby each element produces a first output signal at said first output terminal when said reset terminal is pulsed and a second output signal at said second output terminal when said set terminal is pulsed, a source of input pulses to be counted, gating means connected to said source for directing the flow of said input pulses to all but one of said input terminals of a particular one of said bistable elements, circuit means connected to all but one of said output terminals of said particular one of said bistable elements for applying said output signals to said gating means for the actuation thereof in accordance with an $n$-valued binary cyclic code truth table where $n=2^{m-1}+2$ and $m$ represents the number of said bistable elements, one of the columns of said truth table consisting of $n-2$ consecutive binary ones and two binary zeros, said one of said columns corresponding to said particular one of said bistable elements having the singular input terminal receiving no input pulses, said output pulse being produced at the output of the gating means receiving an output signal from said particular one of said bistable elements, and means for applying to said one of said input terminals of said particular one of said bistable elements an output signal from another of said bistable elements.

3. A binary pulse counter as defined in claim 2 wherein said circuit means includes pulse delay devices, each of which introduces a delay greater in magnitude than the duration of said input pulses.

References Cited by the Examiner

UNITED STATES PATENTS

| | | | |
|---|---|---|---|
| 2,951,230 | 8/60 | Cadden | 340—168 |
| 2,956,181 | 10/60 | Norman | 328—52 |

ARTHUR GAUSS, *Primary Examiner.*

NEIL C. REED, *Examiner.*